Aug. 24, 1943.  L. MIDDLETON  2,327,657
AREA MEASURING DEVICE
Filed April 22, 1940   2 Sheets-Sheet 1
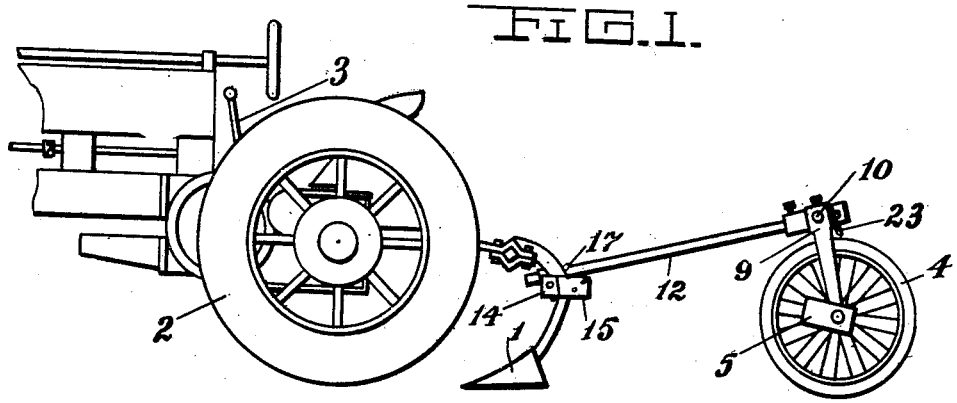
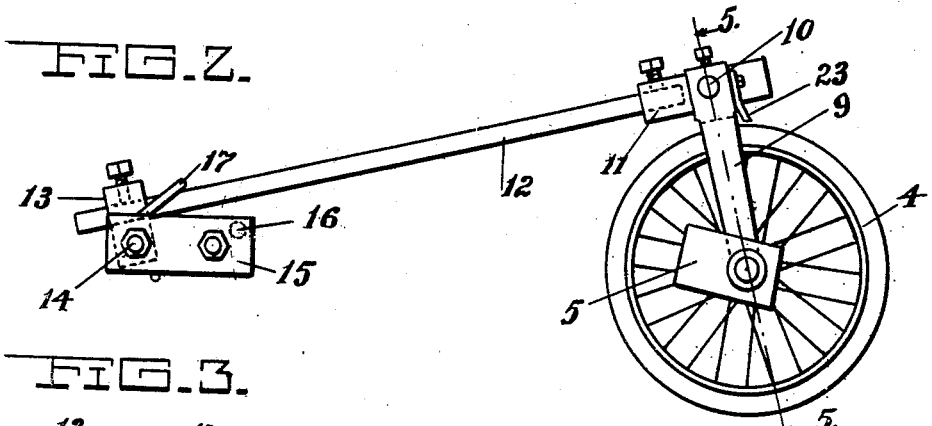
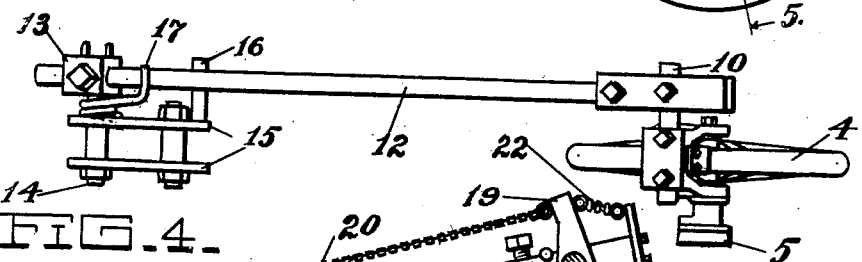
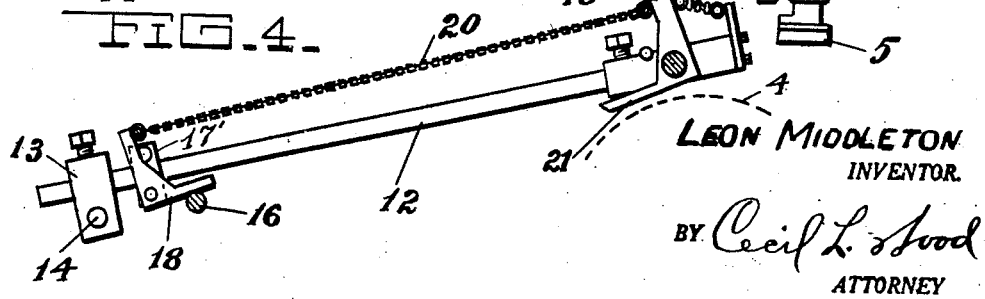
LEON MIDDLETON
INVENTOR.
BY Cecil L. Wood
ATTORNEY

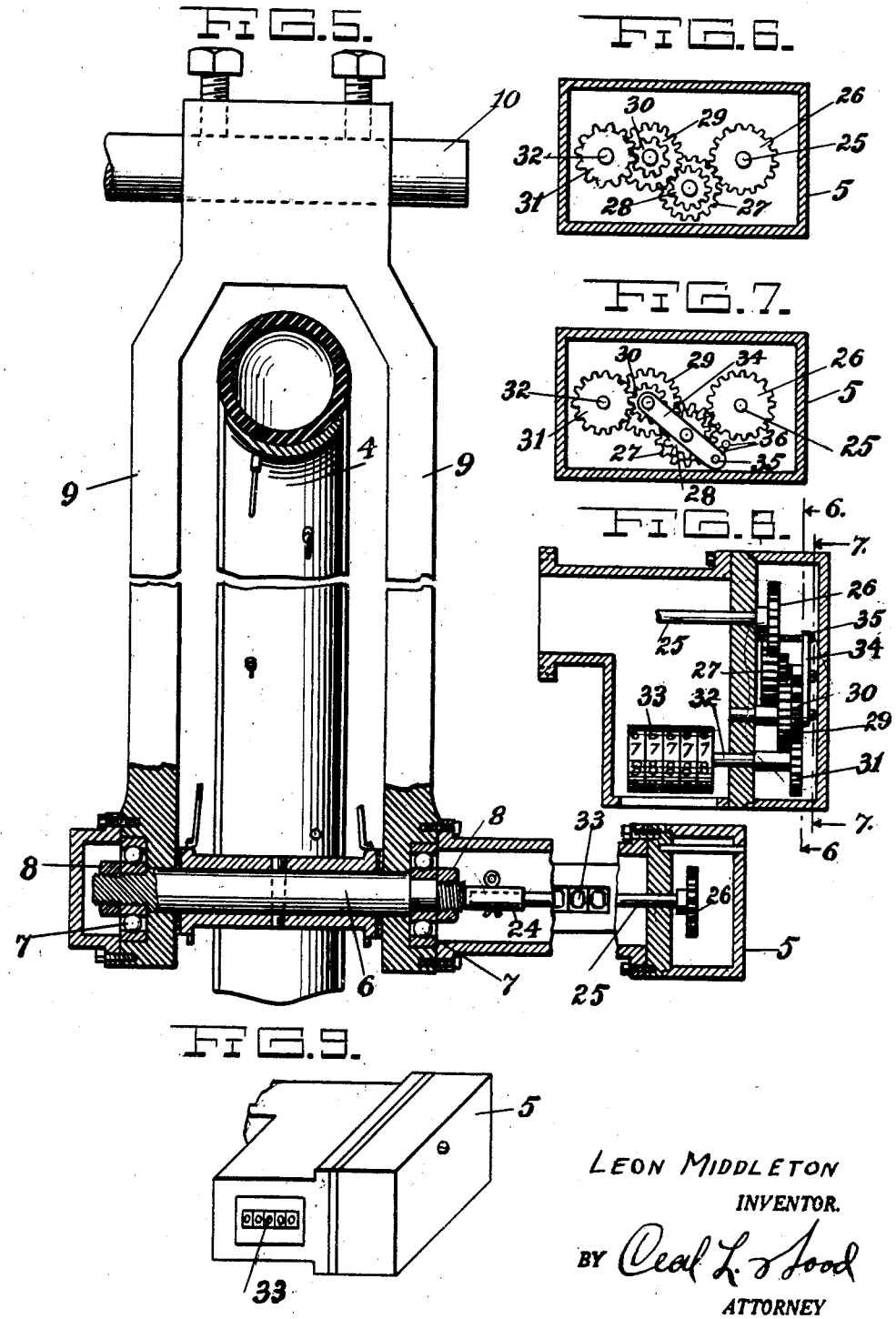

Patented Aug. 24, 1943

2,327,657

UNITED STATES PATENT OFFICE 2,327,657

AREA MEASURING DEVICE

Leon Middleton, Quitaque, Tex.

Application April 22, 1940, Serial No. 330,846

1 Claim. (Cl. 33—142)

My invention consists of certain new and useful improvements in area measuring devices and is designed to be principally used in farm work and in combination with agricultural implements, such as plows, planters, manure spreaders, and the like, for the purpose of determining and recording accurately the area plowed, planted, or otherwise treated, without regard to the regularity of direction pursued by the machine in the process. It is particularly useful when plowing or planting contour leveed farms, where the furrows necessarily follow the curves of the levees, and calculation of the area treated is complicated and difficult.

I attain these objects by mechanism illustrated in the accompanying drawings, in which:

Fig. 1 is a side elevation of my device, showing it attached to a farm plow.

Fig. 2 is a side elevation of the machine, the same view as shown in Fig. 1 but on an enlarged scale.

Fig. 3 is a plan view of the machine.

Fig. 4 is a side view detail of a portion of the device, showing the method of raising and lowering the register driving wheel, and a method of applying a brake to the said driving wheel.

Fig. 5 is a vertical section on the line 5—5 of Fig. 2.

Fig. 6 is a section of the recording and computing mechanism taken on the line 6—6 in Fig. 8.

Fig. 7 is a section on the line 7—7 of Fig. 8.

Fig. 8 is a sectional view of the case, showing a plan view of the computing and recording mechanism.

Fig. 9 is a perspective view of the computing and recording mechanism ready to be mounted on the measuring wheel.

In the accompanying drawings, on which like numerals refer to like parts throughout the several views:

1 is a plow, or a series of plows, arranged laterally and drawn by a tractor or other means 2, the said plow being arranged so as to be capable of being raised or lowered at the discretion of the operator by means of the lever 3.

The measuring wheel 4, carrying at its hub the container 5 of the computing and recording mechanism, is tightly mounted on the shaft 6, said shaft being mounted in the ball bearings 7. The shaft 6 is held against lateral motion by the nuts 8.

The shaft 6 is rigidly connected by the forked member 9 to the supporting bar 10, which is in turn rigidly connected by the clamp 11 to the carrying bar 12, the forward end of which is tightly clamped by the block 13, which has a limited rotative movement in the pin 14, which is in turn mounted to rotate in the clamp 15 which is clamped to the shank of the plow, or other farming implement 1. Extending laterally from the clamp 15 is a lifting pin 16, impinging the under side of the carrying bar 12. Mounted on the pin 14 is a coil spring 17 which bears downwardly on the carrying bar 12 and upwardly on the clamp 15, thus insuring constant contact of the measuring wheel 4 with the ground, despite inequalities of the surface traversed.

A method of applying a brake to the measuring wheel 4, when the plow or other farming implement is lifted from the ground, to prevent its free rotation and consequent over registration, is illustrated in detail by Fig. 4.

Rigidly mounted on the carrying bar 12 is a clamp 17', carrying a pivoted bell crank 18, the lower leg of which contacts the upper surface of the lifting pin 16. The vertical leg of the bell crank 18 is connected to the vertical arm of the pivoted angular braking member 19 by the chain 20, causing the brake shoe 21 to form a braking contact with the periphery of the measuring wheel 4, illustrated in this view by a dotted line. When the farming implement is returned to the ground, the brake is automatically released by the spring 22.

Attached to the rear of the forked member 9 is a scraper 23, which is held close to the periphery of the measuring wheel 4, in order to prevent the accumulation of mud in the wheel, thereby impairing its accuracy.

The container 5 of the computing and recording mechanism is bolted to the forked member 9 in the manner shown in Fig. 5. To the end of the axle shaft 6, and fastened thereto by the cotter pin coupling 24, is a shaft 25 driving the gear 26. The gear 26 drives the intermediate gear 27 and the pinion 28 which is made integral with the gear 27.

The pinion 28 drives the intermediate gear 29, to which is made integral the pinion 30, which drives the gear 31, which by means of the shaft 32 actuates the computing and recording counter 33. The counter 33 is a standard type counter consisting of a series of discs with numbers from zero to ten on the periphery of each, one number of each disc being visible in a reading slot in the case 5. As each disc at the right of the slot makes one complete revolution the disc on its left advances one number.

The intermediate gear 27 and its integrally made pinion 28 are pivoted in the arm 34, which is pivoted on the axle of the intermediate gear 29 and the pinion 30. The opposite end of the arm 34 is fastened to the case 5 by the stud bolt 35. A series of tapped holes 36 in the case 5, the said holes being arranged concentrically with relation to the pivot of the intermediate gear 30, enables changes to be made in the gear ratios by the substitution of gears to replace the intermediate gear 27, or the driving gear 26, or both gears.

The necessity for this changing of the ratio of the gearing between the measuring wheel 4 and the counting and recording mechanism 33 is that the counting mechanism must register in terms of area rather than in terms of distance covered.

For example, the drawings illustrate my device as fitted to a typical plow which plows two 40 inch rows. This is a strip of land 80 inches wide, and when the plow has progressed a distance of 654 feet, one tenth of an acre would have been plowed and this would have been plowed and would be recorded on the counter as 0000.1 acre.

If a greater or lesser width of land is treated changes are made in the gear ratio by the means herein described and illustrated.

Having thus fully described my invention, I claim:

In combination with an agricultural implement, an area measuring machine for attachment to the said implement having a measuring wheel adapted to engagement with the ground, a frame comprising a fork member embracing the said wheel having a coupling bar adjustably attached thereto for connection with the said implement, a clamp pivotally attaching the said bar to the said implement, a brake member operating on the said wheel and pivotally supported by the said frame, a bell crank member pivotally supported by the said coupling bar having an operative connection with the said brake and means comprising a pin rigidly supported by the said attaching clamp adapted to be engaged by one leg of the said bell crank to rotate the same and operate the said brake member.

LEON MIDDLETON.